(12) United States Patent
Sandnes

(10) Patent No.: US 12,499,335 B2
(45) Date of Patent: Dec. 16, 2025

(54) METHOD FOR REAL TIME IDENTITY DETERMINATION OF, AND MATCHING RELATED, ENTITIES AND A SYSTEM FOR MATCHING RELATED ENTITIES

(71) Applicant: REALTIMEID AS, Snåsa (NO)

(72) Inventor: Jan Ivar Sandnes, Snåsa (NO)

(73) Assignee: REALTIMEID AS, Snåsa (NO)

( * ) Notice: Subject to any disclaimer, the term of this patent is extended or adjusted under 35 U.S.C. 154(b) by 0 days.

(21) Appl. No.: 18/699,104

(22) PCT Filed: Oct. 3, 2022

(86) PCT No.: PCT/NO2022/050225
§ 371 (c)(1),
(2) Date: Apr. 5, 2024

(87) PCT Pub. No.: WO2023/059202
PCT Pub. Date: Apr. 13, 2023

(65) Prior Publication Data
US 2024/0403581 A1    Dec. 5, 2024

(30) Foreign Application Priority Data
Oct. 6, 2021    (NO) .................................. 20211199

(51) Int. Cl.
*G06K 7/08* (2006.01)
*G06K 7/10* (2006.01)
*G06Q 50/02* (2012.01)

(52) U.S. Cl.
CPC ..... *G06K 7/10475* (2013.01); *G06K 7/10316* (2013.01); *G06Q 50/02* (2013.01)

(58) Field of Classification Search
CPC ........... G06K 7/10386; G06K 7/10475; G06K 7/10336; G06K 7/10356; G06K 7/10376; H04W 12/06
USPC ......................................... 235/451, 385, 380
See application file for complete search history.

(56) References Cited

U.S. PATENT DOCUMENTS

| 4,503,808 A * | 3/1985 | McAlister | A61D 17/002 |
| | | | 600/551 |
| 9,949,461 B2 * | 4/2018 | Frazier | A01K 29/005 |
| 11,582,948 B2 * | 2/2023 | Garrity | G06K 19/0724 |
| 11,960,957 B2 * | 4/2024 | Mitchell | A01K 29/00 |

(Continued)

FOREIGN PATENT DOCUMENTS

| AU | 2017100671 A4 | 7/2017 |
| WO | WO 2007/106937 A1 | 9/2007 |
| WO | WO 2012/082722 A2 | 6/2012 |

OTHER PUBLICATIONS

International Search Report issued in International Application No. PCT/No. 2022/050225, mailed on Feb. 21, 2023.

(Continued)

*Primary Examiner* — Daniel St Cyr
(74) *Attorney, Agent, or Firm* — Knobbe, Martens, Olson & Bear, LLP

(57) ABSTRACT

A method for matching related entities includes: providing at least one gateway including identity reading capability, detecting and determining, by the at least one gateway, the unique identity of each entity in a group of entities, and storing collected identities and gateway data in an on-site and/or an off-site data storage. A system for matching related entities is also disclosed.

18 Claims, 10 Drawing Sheets

(56) References Cited

U.S. PATENT DOCUMENTS

| | | | |
|---|---|---|---|
| 12,213,455 B2* | 2/2025 | Brayer | A01K 1/12 |
| 2003/0137431 A1* | 7/2003 | Hogan | G06K 7/0008 |
| | | | 119/51.02 |
| 2009/0265106 A1 | 10/2009 | Bearman et al. | |
| 2011/0166793 A1 | 7/2011 | March et al. | |
| 2014/0052685 A1 | 2/2014 | Adair et al. | |
| 2019/0130728 A1 | 5/2019 | Struhsaker et al. | |
| 2020/0163312 A1 | 5/2020 | Majass et al. | |
| 2021/0045362 A1 | 2/2021 | Gritzman et al. | |
| 2021/0112781 A1 | 4/2021 | Crouthamel et al. | |

OTHER PUBLICATIONS

Search Report issued in U.S. Appl. No. 20/211,199, dated Mar. 8, 2022.

Extended European Search Report issued in EP Application No. 22878998.8, dated Mar. 21, 2025.

* cited by examiner

METHOD FOR REAL TIME IDENTITY DETERMINATION OF, AND MATCHING RELATED, ENTITIES AND A SYSTEM FOR MATCHING RELATED ENTITIES

TECHNICAL FIELD

The present disclosure relates to a method for real time identity determination of, and matching related, entities and a system for matching related entities. More specifically, the disclosure relates to a method for determining real time ID, RTID, matching related entities and a system for matching related entities as defined in the introductory parts of claim 1 and claim 14.

BACKGROUND ART

Domestic animals, livestock, are frequently being uniquely identified by RFID ear tags that can be read by scanners, such that an animal and/or products being produced from the animal may be traced. The information read from the ear tags may be stored in local and/or remote databases. Most countries have local regulation governing the collecting, reporting and storing of such data. These stores may further be synchronized with international bodies. One example of such database is European Union's system TRACES which have 85 member nations coupled up to the system. TRACES provides traceability of goods produced of animals within the member counties, aiming to improve animal welfare, ownership records and food safety.

Keeping an exact account of the number of animals, in stock, delivered to processing, and other, is frequently failed. This represents a problem for both owner and authorities, specifically in light of for example where regulations requiring a farmer to report exact numbers of offspring produced, or numbers of animals prepared for processing, or numbers of animals returning from mountain grazing etc. These numbers being used as basis for tax, compensations and other.

There is multiple challenges and problems with present products, systems and reporting strategies.

One problem with the solutions of the prior art is that the systems are expensive to install, and give few benefits for the cost bearer, the farmers/animal owners. One problem with existing prior art is that it is optimized for use in high value livestock, wherein time invested in each animal may be higher than compared with low value livestock, and oversight is easier since the animal are kept in well-defined protected and controlled environments, such as farmhouses, pens and the like. It is easy to keep track of each individual animal and its relations.

For low value livestock there is a further problem with the reliability of the RFID-based technology in prior art techniques. Too often will an RFID reader be unable to read an intended tag, but read a neighbor tag instead. Even if the owner handles the reading process according to user manual, when animals flock, the pointing of the reader towards an RFID based tag, the reader will "beep" for received data, and owner will move onto next animal without being able to qualify whether the "beep" registered a false RFID or a true one. Every time a false is read, the counting process fails with a further animal. It is proven that when counting flocks of hundreds of animals, it is practically impossible to get a correct count.

It is experienced that even slaughter houses with advanced reading stations, comprising multiple antennas and large computing resources, may fail to count and identify animals correctly.

Challenges experienced with low value livestock on free grazing is related to be able to monitor numbers and relations between the animals, and to be able to detect anomalies.

Typical threats in free grazing environments are predators attacking livestock, harsh nature separating mothers from offspring, inability for owner to keep track and accountability of the livestock members at all times.

It is also a problem that when counting/monitoring animals, prior art does not offer more than a simple unreliable count of the number of animals, and anomalies and bad health often goes unnoticed for long periods.

There is thus a need for improved system that can expand the use benefits of a tag system, where the industry maintain its requirements for traceability, but where the system improves the features and services to the animal owners of low value livestock in a free grazing environment.

SUMMARY

It is an object of the present disclosure to mitigate, alleviate or eliminate one or more of the above-identified deficiencies and disadvantages in the prior art and solve at least the above mentioned problem.

Although the present disclosure defines a method and system for improving overview and status of free grazing low value livestock, such as sheep, goat and reindeer, it may be adapted to provide similar services in any industry/environment where oversight and relation between entities needs to be monitored and defined in real time, not limited to livestock.

Thus, according to a first aspect there is provided a method for matching related entities comprising:
  providing at least one gateway comprising identity detection capability,
  detecting and determining, by the at least one gateway, the unique identity of each entity in a group of entities.

By arranging gateways able to identify entities, it is an advantage to be able to track any entity at the gateway locations where it is likely that entities are passing/gathering. Thus arranging the gateways in key locations will improve the efficiency of the inventions of present disclosure.

According to some embodiments, the gateways further comprises:
  equipping each entity with a transmitting device, tag, the tag broadcasting a signal comprising a unique tag id corresponding to the unique identity of said entity at predefined broadcasting intervals, and
  the gateway comprising an omnidirectional or directional antenna for receiving said signals when the received signal strength is above a predefined threshold.

Depending on the topology of the environment wherein the gateways are arranged and the entities will be, and the received strength of the signal from the devices, the threshold may be used to discriminate between signals from distant entities. Multiple signal strength thresholds, being representatives for corresponding distances between a tag and a gateway, may be defined to discriminate between entities at different distances from a gateway in question.

The present enclosure describe how the gateways and back office services may determine an error free count of numbers of detected animals.

According to some embodiments, the antenna of the gateway further determining the direction of the broadcasted unique identity of any entity.

By enabling the gateway to determine the direction from which a signal is received aids in the localization of the entity.

According to some embodiments, the method comprises: determining the distance between the entity broadcasting its identity and the gateway, based on the received signal strength of the broadcasted identity.

The received signal strength may vary dependent on for example: distance between the sender and the receiving gateway, topography, and obstacles between sender and the gateway.

According to some embodiments, the method comprises: storing collected identities and gateway data in an on-site and/or an off-site data storage.

The identities and relations between the identities may be determined at the gateway and/or in a remote computer resource. Examples of remotes resources may be cloud based Internet connected services, cell phone services or other.

According to some embodiments, the method comprises: receiving a first unique identity of any entity by a gateway, wherein the gateway comprising identity reading capability,
receiving a second unique identity of any other entity within a first predefined timeframe of the first unique identity by said gateway,
comparing the received strength of the signals of the first and the second unique identity, and
determining potential closeness of the two compared entities.

Depending on topography, entity type, transmission range and other, it may be advantageous to be able to alter the timeframe defining how close two or more entities may be determined to be apart.

According to some embodiments, the method comprises: determining a probability of a relation between any two entities by the determined potential closeness of the two entities when read inside the first defined timeframe.

According to some embodiments the method comprises: receiving by a further one or more gateways comprising identity reading capability, the first unique identity,
comparing the first unique identity with a received second unique identity of any other entity received within a first defined timeframe of the received first unique identity by said further one or more gateways,
re-determine the probability of a relation between the two entities based on repeated determined potential closeness of the two entities relative each other identified by two or more gateways,
storing a confirmed relation between the identified entities when the probability of a relation is above a predefined probability threshold in the on-site and/or off-site data storage.

According to some embodiments, the method comprises: receiving a first unique identity by one or more gateways in a first timeframe,
comparing the first unique identity with a received second unique identity of any other entity received within a first defined timeframe of the first unique identity received by said one or more gateways,
changing the probability of a relation between the two entities based on repeated received and determined potential closeness of the two entities relative each other identified by said one or more gateways in a second timeframe later than the first predefined timeframe, and
storing a confirmed relation between the identified entities when the probability of a relation is above a predefined probability threshold in the on-site and/or off-site data storage.

According to some embodiments, the method comprises: detecting if related entities are separated.

According to some embodiments, the method comprises: activate mitigating actions to pair separated related entities.

According to some embodiments, wherein the probability of a relation translates to being one of non-related, potential related, likely related, very likely related and certain related.

According to some embodiments, the related entities comprise a first entity being a patron and a second entity being a client.

According to some embodiments, the patron is a mother, and the client is an offspring.

According to some embodiments, the entities are livestock.

According to some embodiments, the unique identity of an entity is facilitated by a carried tag, wherein the tag is able to broadcasting a unique Id.

According to some embodiments, the tag comprise one or more of: a battery, a processing device, a wireless communication device, an accelerometer, a magnetometer, and one or more environment sensors.

According to some embodiments, the tag may comprise an additional passive or active RFID tag.

According to some embodiments, the gateway comprising identity detection capability for detecting the identity of any entity the method comprises one or more of: power supply by grid or battery, a processing device, wireless communication device, an accelerometer, a magnetometer, and one or more environment sensors, the gateway being stationary or mobile.

According to a second aspect there is provided a system for matching related entities comprising:
a group of entities, wherein any of the entities carries said, two or more said gateways
cloud services communicating with the gateways According to some embodiments, the cloud services comprises one or more of:
a database for storing identities and relationships among the identities within the group of identities,
a processing means for providing further statistics for the group of identities,
a communication interface for communicating and/or exchanging data with third part service providers or authorities or other services.

According to some embodiments, the system comprises: one or more mobile communication devices comprising at least a first communication module for communicating with the gateways and/or the tags carried by the entities, and optionally:
the communication devices further comprising a second communication module for communicating with the cloud services for sending/receiving data and analysis data to/from the cloud services.

According to some embodiments, the mobile communication module is a smartphone.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Terminology

The term "low value livestock" is to be interpreted as animals are considered to have a lower individual value or with less economic interest, as is the case in small ruminants such sheep and goats. They are often managed as a group, flock or herd and only average welfare state might be considered. In present disclosure the embodiments may further be used on other livestock.

The term "predefined threshold" is defined by the gateway characteristics used to discriminate between received signal strength from tags, and may be defined: in production of, upon deployment of, or during use via a configuration routine adapted to, the gateway.

The term "predefined timeframe" is defined by the gateway characteristics used to define the valid timeframe for detecting a nearby entity within the same reading time slot. The predefined timeframe may be defined: in production of, upon deployment of, or during use via a configuration routine adapted to, the gateway.

The term "predefined probability threshold" is defined by the characteristics used to define relation status of entities, the probability thresholds may be implemented by the gateways, the back office services or other connected processing resources (such as a smart phone). The probability threshold may be defined: in production of, upon deployment of, or during use via a configuration routine adapted to, the gateway or services provided by the back office services or other connected processing resources.

The term "predefined hit count number" is defined by the characteristics used to define a correspondence between numbers of times entities has been detected by the same gateway within the same timeframe and the probability of a relation status of the entities, the hit count number may be implemented by the gateways, the back office services or other connected processing resources (such as a smart phone). The hit count number may be defined: in production of, upon deployment of, or during use via a configuration routine adapted to, the gateway or services provided by the back office services or other connected processing resources. The hit count number may also be influenced by weighting parameters.

The term "predefined broadcasting interval" is defined by the tag characteristics used to control the frequency of transmitting the data comprising its unique id, and may be defined: in production of, upon deployment of, or during use via a configuration routine adapted to, the tag.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 1 shows a simulation for counting entities using stationary gateways, sheep FIG. 2 shows a simulation continued from FIG. 1 for counting entities, sheep FIG. 3 shows as simulation for counting entities having moving gateways, sheep FIG. 4 shows a simulation continued from FIG. 3 for counting entities, sheep FIG. 5 shows a simulation for counting entities using stationary gateways in a farmhouse or truck, sheep FIG. 6 shows the first step in a simulation for counting entities and estimating livestock matching FIG. 7 shows the second step in a simulation for counting entities and estimating livestock matching, illustrating the signal levels detected in gateway 3, GW3

FIG. 8 shows the third step in a simulation for counting entities and estimating livestock matching FIG. 9 shows the fourth step in a simulation for counting entities and estimating livestock matching FIG. 10 shows the fifth step in a simulation for counting entities and estimating livestock matching FIG. 11 shows the sixth step in a simulation for counting entities and estimating livestock matching FIG. 12 shows the seventh step in a simulation for counting entities and estimating livestock matching FIG. 13 shows the first step in a simulation with moving gateways and a predator attack FIG. 14 shows the second step in a simulation with moving gateways and a predator attack FIG. 15 shows the third step in a simulation with moving gateways and a predator attack FIG. 16 shows the fourth step in a simulation with moving gateways and a predator attack FIG. 17 shows the first step in a simulation with moving gateways and separation caused by misfortune or disease FIG. 18 shows the second step in a simulation with moving gateways and separation caused by misfortune or disease FIG. 19 shows the third step in a simulation with moving gateways and separation caused by misfortune or disease FIG. 20 shows a system setup for automated livestock authority report FIG. 21 shows a system setup for automated individual livestock entity authority report FIG. 22 shows a system for livestock group surveillance FIG. 23 shows a system for entity health surveillance and analysis FIG. 23A shows a system for entity health surveillance and analysis wherein the gateway and/or the cloud based back office function is partly or completely substituted by an App running on a Smartphone.

FIG. 24 shows a layout of one version of ear-tag

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
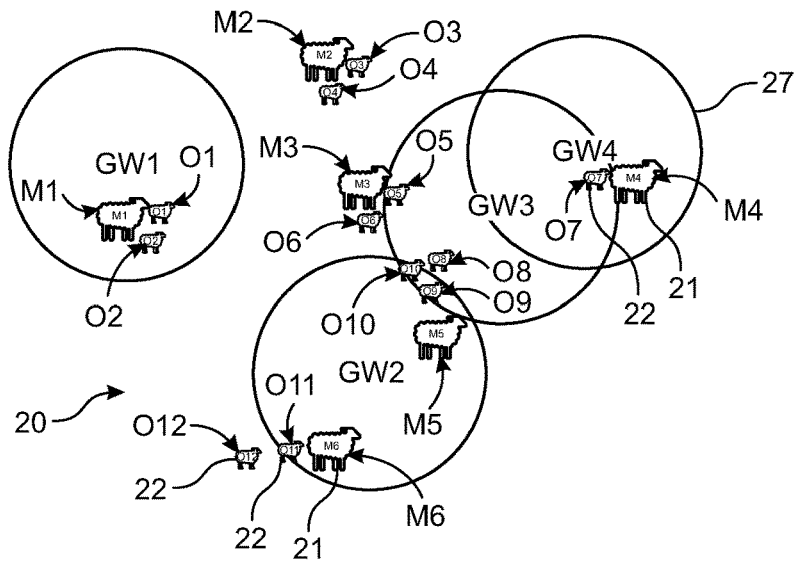
FIG. 1 to FIG. 19 shows various scenarios as simulated with inventions according to present disclosure.

All figures comprise a livestock illustrated by a group of or individuals of sheep. It should however be understood that the inventions discussed in this disclosure also shall comprise control of any type of entity, where it is necessary to count, and/or establish relationships, and/or detect anomalies in the group of entities based on relations, and/or presence, and/or lack of detected presence. That said, the inventions are facilitated by deficiencies in presently available systems and techniques for controlling and surveilling low value livestock.

The first aspect of this disclosure shows a method for matching related entities comprising:
  providing at least one gateway 10 comprising identity detection capability,
  detecting and determining, by the at least one gateway 10, the unique identity of each entity 21, 22 in a group 20 of entities.

The inventions of present disclosure are known from the ability to uniquely differentiate each individual entity from each other in a real time setting. This may be done by arranging a tag 1 on the entity 21, 22, the tag 1 having the feature of carrying a unique identifier. Other alternatives for uniquely identifying an entity may be from image detection (not part of present invention) and recognizing unique feature with an entity.

By registering unique identities, the gateways and connected back office systems is enabled to provide an exact error free count of numbers of entities passing the gateways. Thus, any problems with manual counting or error prone manual use of a tag readers are eliminated.

Any determined relation may be classified according to predefined relationship definitions. This may be defined by how the entities move together or how they locate relative each other over time. The probability of a relation may be determined and translates to a predefined scheme such as for example being one of non-related, potential related, likely related, very likely related and certain related. Other classification schemes may be defined.

In further relationship scheme the entities may be defined as being related to each other, wherein the related entities comprise a first entity 21 being a patron and a second entity 22 being a client.

When the entities are members of a livestock group the patron 21 may be a mother, and the client 22 may be an offspring.

Figure 2:
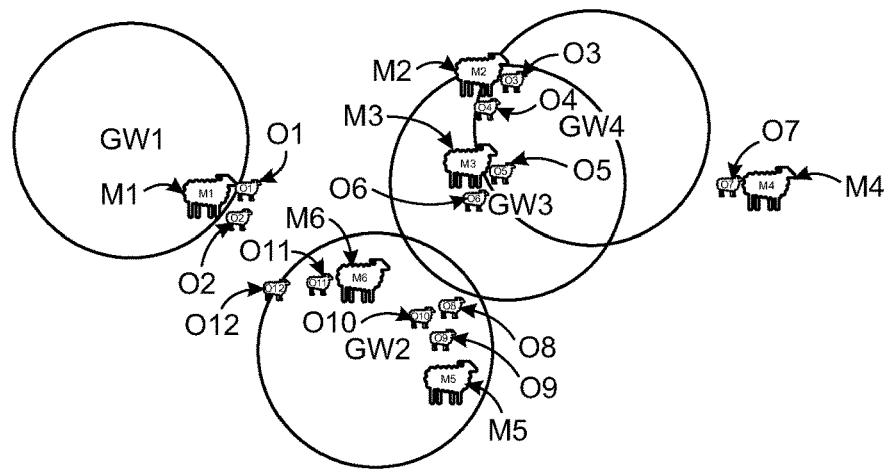

A setup is exemplified in FIG. 1 and FIG. 2, where a moving group of entities are monitored with 10 seconds interval by 4 stationary gateways, GW1, GW2, GW3, and GW4. In FIG. 1 it may be seen the following detected entities in each gateway:
  GW1: M1+O1+O2
  GW2: M5+M6+O9+O10+O11
  GW3: O5+O8+O9+O10+O7
  GW4: M4+O7
  Wherein 'GW' denotes gateway, 'M' denotes a mother, and 'O' denotes an offspring.

Even if not all entities are counted in the first instance, a situation report 10 seconds later of the same gateways, as seen in FIG. 2, may reveal the following detected entities in each gateway:
  GW1: M1
  GW2: M5+M6+O8+O9+O10+O11+O12
  GW3: M3+M2+O3+O4+O5+O6
  GW4: M2+O3+O4+O5

Thus, it may be read from this simulation that the whole group of entities, M1-M6 and O1-O12, may be accounted for, counted, simply by arranging each gateway in a manner that enables them to connect with the group of entities where it is natural to come in contact with an entity. One could also assume that further readings with same or other time delay is performed to increase quality of the counting.

The position of a stationary gateway may best be arranged where there is a high probability of entities to be/pass. This may be an open grid between grazing areas, a salt stone, a feeding area, a path or other.

Figure 20:
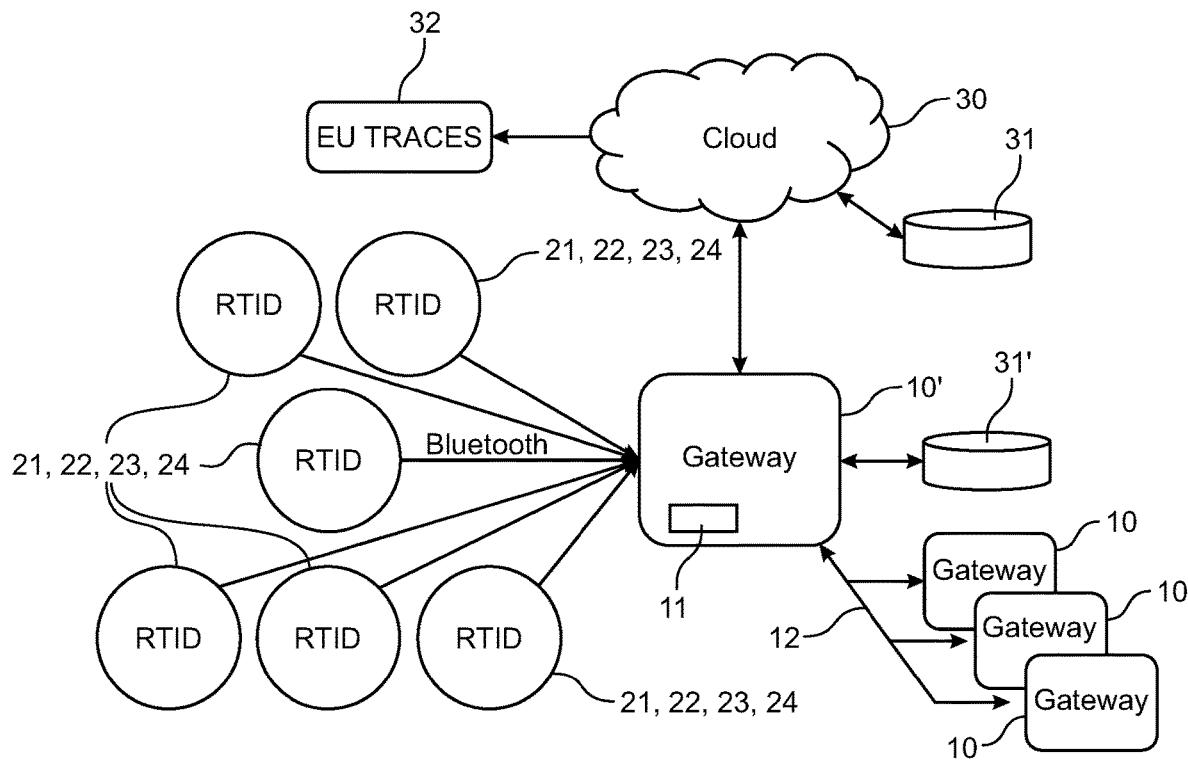
FIG. 20 to 23 shows various system solutions wherein gateways, entities and cloud services are connected and provides services for improving surveillance and overview of the livestock, including reporting to authorities.

In FIG. 20 it is exemplified in a block diagram how a gateway may be receptive to signals communicated by the entities via for example a low energy Bluetooth broadcasting communication protocol, and the gateway may communicate over a second communication channel with a cloud based system 30 comprising both storage 31 and further links to other databases and/or systems 32. One such other databases and/or systems is the EU TRACES system 32 keeping available an updated database for each individual animal in a farmers livestock. Thus by implementing one of the embodiments of present disclosure, a farmer may benefit from a service of easy reporting of livestock as imposed by authorities or other. Communication chipsets used in tags may comprise other communication protocols and radio frequency, such as: Bluetooth Classic, Bluetooth Low Energy and Bluetooth Mesh, Wi-Fi and ZigBee, and others.

In a future use case, not part of the invention, a gateway may be comprising image capturing features, and the gateway and/or cloud service/back office systems may further comprise image/video analysis features able to detect individual features/behavior of the entities or markings/labels on the entities.

FIG. 20 to FIG. 23 describes a remote cloud based service 30 comprising a back office support system, but it should be understood that the cloud based service may be substituted by any remote system or back office system able to communicate with the gateways either via wired, or wireless, or a combination of the two, communication channel. Any appropriate communication protocol may be used for communication between gateways and back office services, including but not limited to: internet, NB-IoT, Wi-Fi, TCP-IP, Bluetooth, ZigBee, GSM, 3/4/5-G (generation) or later mobile network, satellite based system or other.

One or more gateways are provided to determine the unique identity of each entity.

The method where the gateways 10 detecting and determining the unique identity, of each entity (21, 22) in a group (20) of entities may further comprise:

equipping each entity 21,22 with a transmitting device, tag 1, the tag 1 broadcasting a signal comprising a unique tag id corresponding to the unique identity of said entity (21, 22) at predefined broadcasting intervals, and the gateway 10 comprising an omnidirectional or directional antenna 11 for receiving said signals when the received signal strength is above a predefined threshold.

Figure 24:
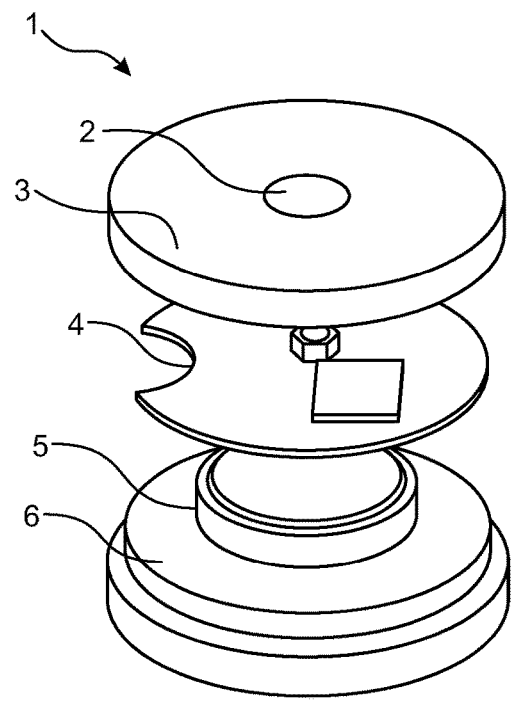
FIG. 24 shows an exploded view of an ear-tag worn by an entity of a livestock, for example a sheep.

In FIG. 24 it is shown an example of a tag 1, more precisely an ear tag, to be worn by for example a low value live stock. By defining a limited broadcasting message, a limited signal strength and a sufficiently large power source 5, it is possible to maintain a live tag for required time frame. By limiting the regular broadcasted message to comprise as little as for example only an identification number of the tag, tag id, representing/corresponding to the identity of the entity, and limiting or eliminating the signal receiving abilities of the tag it is possible provide a tag that may live for years, possibly for 10 years or more. For simplicity it can thus be said that the tag broadcast the unique identity of the entity it is associated with. The tag may be configured to broadcast signal at a set signal strength. This may be adapted to the environment the tag is to operate in, and the required lifetime the tag must operate.

The embodiments in present disclosure are directed towards examples wherein a Bluetooth enabled tag communicates with any of the gateways, and the gateways communicates with a cloud based back office service via a smartphone network. The communication protocols and the computer/communication devices used to facilitate the data transmissions between the ear tag/gateways and the back office services may be chosen from well-known techniques.

A first embodiment of the gateway comprise an omnidirectional antenna 11, for receiving the broadcasted unique identity of the tags worn by all of the entities in a group being surveilled. The gateway antenna and signal processing modules comprised within the gateway is enabled to differentiate between received strength of the signals broadcasted by the tags, and thus is able to define an approximate estimated distance between the entities and the gateway within its reach. Such different signal levels 27, 27', 27", 27''' are illustrated for GW3 in FIG. 7 were the gateway is able to detect that M3+O5+O6 is closer to the gateway than M2+O3+O4.

The gateway characteristics may be configured in production, upon deployment, or during use. When already in use, the gateway may be configured/reconfigured by back office services and communication, or by a remote connecting to the gateway, such as a smart phone with a configuration program installed. Characteristics that may be configured may comprise signal thresholds, timeframe for accepting received signal within the same reading, probability and weighting parameters, and others.

Figure 3:
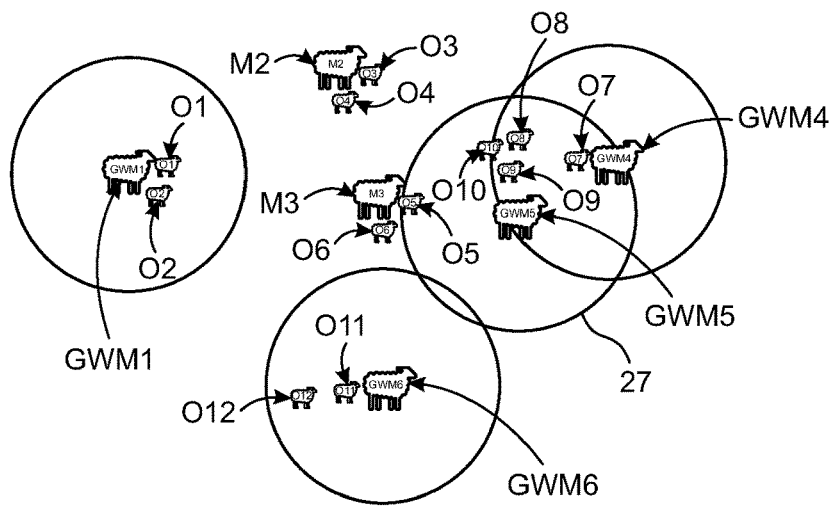
Figure 4:
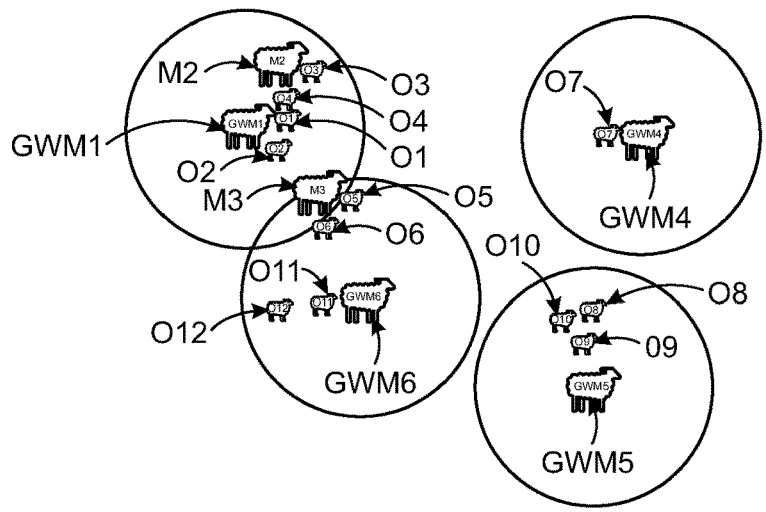

A further embodiment of the gateways are illustrated in the simulation presented in FIG. 3 and FIG. 4, where the gateways are mobile, i.e. they may be arranged for example to be carried by an adult of the livestock, for example number of the mothers of a group of entities are carrying gateways.

The gateways may be set up to communicate individually with the back office system, but in any of the embodiments some gateways may also be configured to communicate with one or more of the other gateways, and also function as a network gateway 10' for the connected gateways providing a communication channel between these other gateways and the back office systems. A network gateway 10' may also comprise all the same feature as a gateway 10 communicating with the entities 21, 22.

In FIG. 3 it is exemplified that M1, M4, M5 and M6 are provided with mobile gateways, and the gateways 10,10' perform a poll every 10 second. In the first poll it can be seen that the gateways identifies the following entities within their antenna reach, or receiving signals above the predefined minimum signal strength threshold:

GW M1: M1+O1+O2
GW M4: M4+O7+M5+O8+O9+O10+O5
GW M5: M5+O8+O9+O10+M4+O7+O5
GW M6: M6+O11+O12

FIG. 4 show a situation 10 seconds later than is seen in FIG. 3, and the gateways now identifies:

GW M1: M1+O1+O2+M2+O3+O4+M3
GW M4: M4+O7
GW M5: M5+O8+O9+O10
GW M6: M6+O11+O12+O6+O5+M3

It is shown that the whole group is identified by merely 2 polls captured 10 seconds apart, and it can be seen that the M2+O3+O4, and M3+O6 was not detected in the first poll, but 10 seconds later the undetected entities from the first poll were all captured by GW M1 and GW M6 respectively. Now all members of the group has been counted and are accounted for.

The antenna 11 of the gateway 10 may further be configured for detecting the direction 28 of the broadcasted unique identity of any entity 21,22 within the reach of the antenna 11. Thus it may be possible to detect which entity 21,22 is close to any other detected entity 21,22, by using only one timeframe reception from a single gateway 10. For example will the detected entities in GW2 of FIG. 7 be able to detect M6+O11+O12 and determine that these entities are relatively close to each other compared to O8+O9+O10 which is determined to be closer to M5, when a directional antenna 11 is used to select a defined section 28 of the surrounding.

Thus, it is not only possible to detect which entity is inside the detection range of a gateway, but for some antenna configurations it may be possible to determine the distance between the entities 21,22 broadcasting their identity, based on the signal strength received by the gateway 10 of the broadcasted identity, and/or the direction from where the signal is received relative the gateway 10.

As discussed above, the back office system, for example cloud based, may comprise storage and database systems for storing and handling any data collected by the gateways 10. In some embodiments the gateway may also be provided with local storage 31' for storing collected information received from the entities or derived by the gateway. One gateway may, as seen in FIG. 20, be set up to communicate 12 with other gateways and receive and store the data collected/determined by a number of other gateways. Thereby the collected identities and gateway data may be stored in an on-site and/or an off-site data storage 31, 31'.

When the gateways are configured with an omnidirectional or directional antenna 11, it is possible to detect relative closeness of two or more entities by defining a time domain approach to sampling signals received by only one gateway. This may be achieved by processing any signals received within a timeframe, for example 10 seconds. This may allow for example two or three entities moving together to be defined together if their transmitted signal are received by a gateway within for example 10 seconds of receiving the identity of the first entity. Thus the method would comprise:

receiving a first broadcasted signal comprising a unique identity of any entity 21, 22 by a gateway 10, wherein the gateway 10 comprising identity reading capability, receiving a second broadcasted signal comprising unique identity of any other entity 21, 22 within a predefined timeframe of the first unique identity by said gateway 10, comparing the received strength of the signals of the first and the second unique identity, and determining potential closeness of the two compared entities.

Thus, a goal for such a process is to determine a probability of a relation between any two entities 21,22 by the determined potential closeness of the two entities 21,22 when read inside the first defined timeframe.

Now, taking the concept a bit further it is also possible to determine related entities being moving together, but not so close to each other that they are detected by the same gateway within the predefined timeframe, or where the relationship has not be established with acceptable certainty. Relatives may thus be detected by two or more gateways by:

receiving by a further one or more gateways 10 comprising identity reading capability, the first unique identity, comparing the first unique identity with a received second unique identity of any other entity 21,22 received within a first defined timeframe of the received first unique identity by said further one or more gateways 10, re-determine the probability of a relation between the two entities based on repeated determined potential closeness of the two entities 21,22 relative each other identified by two or more gateways 10, storing a confirmed relation between the identified entities 21,22 when the probability of a relation is above a predefined probability threshold in the on-site and/or off-site data storage 31, 31'.

It is further possible to use one or more gateways for determining relations by extending the time domain to encompass more than one time frame within which a reception of signals are processed. Thus, the method may comprises:

receiving a first unique identity by one or more gateways 10 in a first timeframe, comparing the first unique identity with a received second unique identity of any other entity 21,22 received within a first defined timeframe of the first unique identity received by said one or more gateways 10, changing the probability of a relation between the two entities based on repeated received and determined potential closeness of the two entities relative each other identified by said one or more gateways 10 in a second timeframe later than the first predefined timeframe, and storing a confirmed relation between the identified entities 21,22 when the probability of a relation is above a predefined probability threshold in the on-site and/or off-site data storage 31.

Figure 5:
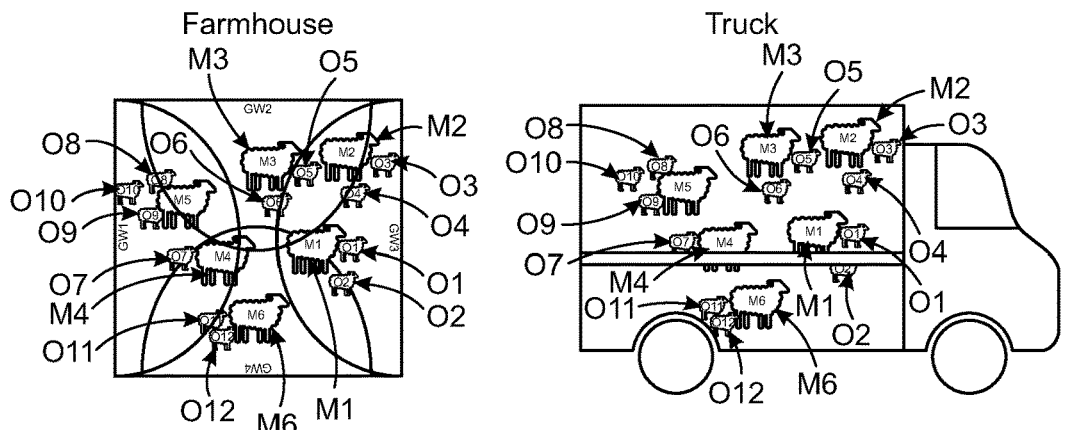

There are numerous scenarios that may be mitigated by being able to closely monitor how the related entities move within their environment. For example as shown in the scenarios in FIG. 5, wherein the system is implemented to surveillance enclosed environments such as a farmhouse or transport wagon such as a truck. These are environments that may be densely populated, and manually keeping track of whether related entities can maintain their needed closeness is almost impossible for a caretaker/owner. Using gateways with shorter reach, and/or being enabled to discriminate signal directions and thresholds adapted to the environment, may provide valuable in situ overview of each entity and if a cause for distress and worries evolves.

One scheme of differentiating between relations may differ between embodiments and movement behavior of a group of entities. In one instance it may be sufficient to monitor hit at two different gateways to label an two entities as either "potential" relatives or "confirmed" relation.

In other scenarios/group of species it may be necessary to use multiple detections to differentiate between several levels of certainty of detected relation, wherein the probability of a relation translates to being one of non-related, potential related, likely related, very likely related and certain related, for example as seen in the following examples discussed in the FIGS. 6 to 12: "potential" relation, "likely" relation, "very likely" relation, and "certain" relation. Different schemes may be chosen to adapt to the composition of entities and group of entities. A larger size group may need more qualified readings (hits) to determine relation between entities.

The schemes are based on a calculation of a probability score that are being recalculated every time an entity is observed by a gateway. The probability score denotes a percentage probability that a scheme value is reached. Lowest probability is 0, and highest is 1 (100%).

In the above example it may be implemented a scale according to the following:

| Cumulative (and weighted) hit score of probability | Scheme value |
| --- | --- |
| 0-0.2 | None |
| 0.21-0.4 | Potential |
| 0.41-0.6 | Likely |
| 0.61-0.8 | Very likely |
| 0.8-1.0 | Certain |

The cumulative hit score may be recalculated for each time an entity is detected by a gateway, and the detection may further be weighted when the reading is used in a calculation/recalculation. That is for example: a reading comprising distance from gateway will have a higher weighting when the distance is equal or close to a compared entity than if the distance value is very different from the other entities readings. Weighting may also be affected by simultaneous readings of the same entity by multiple gateways compared to entities being read by only one gateway. For example as is illustrated in FIG. 4, O6+O5+O12 will have similar read signal strength by GW M6, and may be weighted similar as siblings and offspring of M3, but at the same time GW M1 will read O6+O5 at the lowest received strength, and the weighted value as offspring of M3 will increase compared to O12 which is not detected by GW M1. The lower weighting of O12 as sibling to O6+O5 and offspring to M3 may increase the probability of O12 being offspring of M6.

Depending on numbers of gateways, and their positioning, if they are stationary or mobile, and further on the size of the group of entities, and the characteristically movement pattern of the entities, it should be possible to achieve a certain status of all entities by readings over a 48 hours period, and a fairly good assumption already at 4 hours. All these elements must be considered when the probability and weighting parameters are defined.

When detecting relation between animals, the dependency of an offspring to its mother is strongest early in life cycle, and less the older the offspring is. This may be accounted for when defining the probabilities and weighting. And also when using the system to detect missing offspring, a time period where offspring is away from mother is alarming at a much lower value early in the offspring's' life cycle, and higher the older the offspring is.

The simplest formula would be to maintain an array of hit count numbers for each offspring detected together with a mother over time, and when hit count has reached a predefined hit count number the relation between mother and offspring will be allocated a scheme value.

Figure 7:
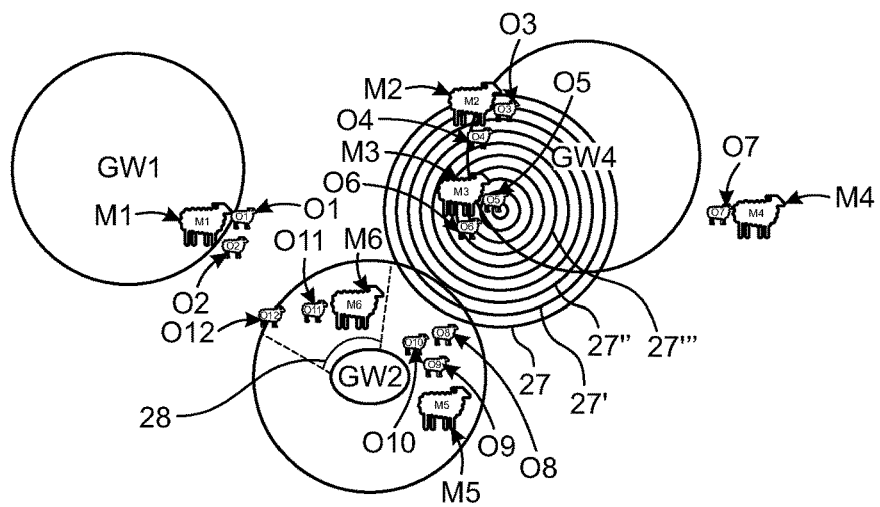

In FIG. 6 to FIG. 12 it is shown a simulation that demonstrate how repeated recognition of mother and offspring may be determined. Each instance is taken in 10 seconds intervals, wherein in the first instance in FIG. 6 the different gateways may detect:

M1: MH1 O1+O2 GW1
M2: MH0 Not identified
M3: MH0 Not identified
M4: MH1 O7 GW4
M5: MH1 O9+O10+O11 GW2
M6: MH1 O9+O10+O11 GW2
--: O5+O7+O8+O9+O10 GW3

Wherein M represent the mother, MH is number of Match Hit, and SS is received signal strength ranging from 1 farthest out from gateway centre, and 10 being centre of the reach circle of each gateway, as is exemplified in FIG. 7 for GW3.

The above listing means that M1 is detected by one gateway, GW1, for the first time, MH1, and that offspring O1 and O2 is also detected. Neither of M2 or M3 is detected, and may raise a concern flag in the surveillance system. M4 is detected by GW4 together with O7 for the first time, and M5 is detected with possible offspring O9+O10+O11 by GW2. The gateways here typically do not discriminate on direction, thus O9, O10, and O11 is determined to be equally spaced from centre of gateway reach. These offspring may be regarded with same probability to be related to one of M5 or M6.

GW3 detects O5+O7+O8+O9+O10 but no M.

Figure 6:
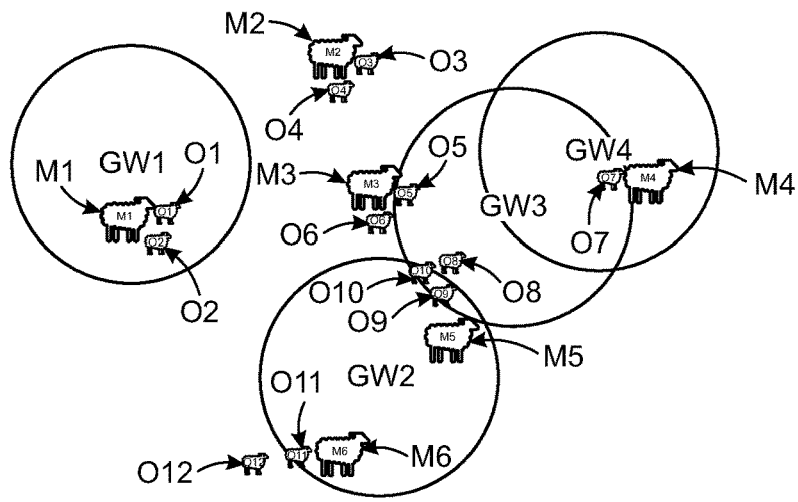

In FIG. 7 which is illustrating the locations of the entities 10 seconds later than in FIG. 6, the following may be depicted (bold indicates a potential relation):

M1: MH1 GW1
M2: MH1 O3+O4+O5+O6 GW3 (O3+O4 SS2-4), MH2 O3+O4+O5 GW4
M3: MH1 O3+O4+O5+O6 GW3 (O5+O6 SS7-9)
M4: MH1 Not identified
M5: MH2 O9+O10+O11 (O12 SS1)
M6: MH2 O9+O10+O11 (O12 SS1)

In this instance it can be determined that M1 is detected alone by GW1, and therefore no more Match Hit is detected and M1 stays at MH1. M2 is detected for the first time by GW3, and M2's relation to possible offspring is also a First Hit FH1. GW3 may have the ability to distinguish between received Signal Strengths, and O3 and O4 is detected with SS2 and SS4 respectively.

O3+O4+O5 is detected for the second time MH2 by GW4, and thus a potential relation may be established between M2, O3 and O4, based upon the estimated possible closeness of O3 and O4 from GW3 reading.

M3 is detected for the first time MH1 by GW3 together with O3+O4+O5+O6 wherein O5 and O6 is detected at range SS9 and SS7 respectively.

M4 is not detected and stays at MH1.

M5 is detected for the second time MH2 together with O9+O10+O11 as is M6. Thus, both M5 and M6 is associated with a potential relation with O9+O10+O11.

Now it is seen that no absolute certain hits for mother and offspring is detected within the two first time domain sections at 0 and 10 seconds.

Figure 8:
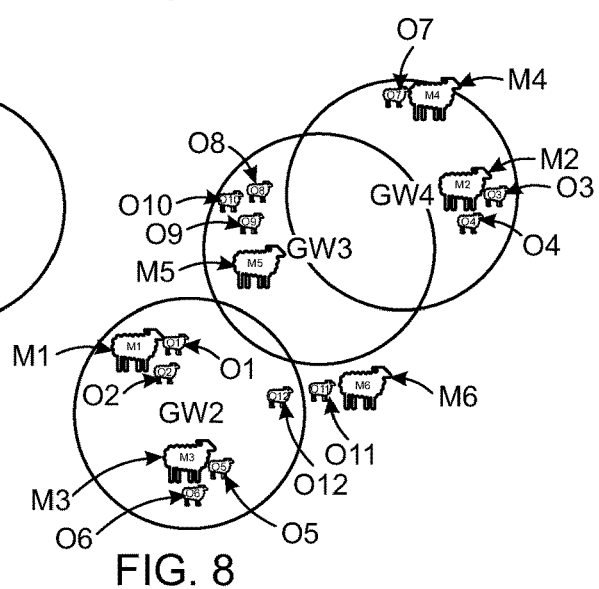

At the third scenario, a further 10 seconds later, may change this as is seen in FIG. 8.

Here it is seen that (italic denotes likely match):

M1: MH2 O1+O2+O5+O6+O12 GW2
M2: MH3 O3+O4+O7 GW4
M3: MH2 O1+O2+O5+O6+O12 GW2
M4: MH2 O3+O4+O7 GW4
M5: MH3 O8+O9+O10 GW3
M6: MH2 Not identified The red O3 and O4 is found by GW4 for the third time MH3 together with M2, and a likely match as mother and offspring is determined. Also M5 is observed for the third time together with O9 and O10 (italic) and a likely match is determined. It should be noted that O8 is not detected together with M5 for more than two times at this stage, and a match cannot be established.

Figure 9:
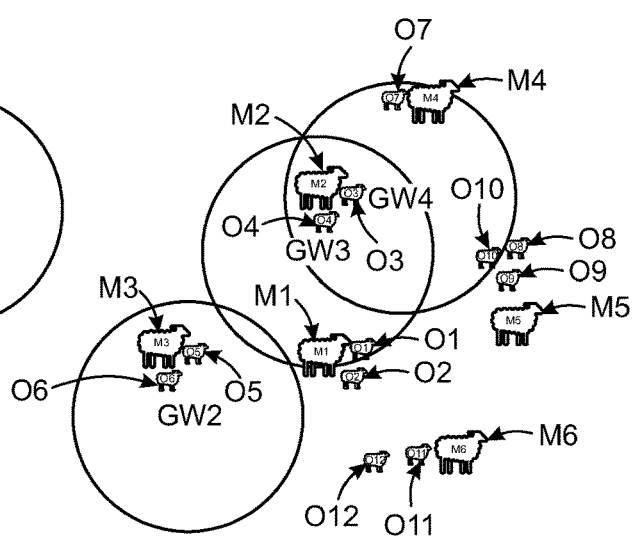

In FIG. 9 the following relations may be detected (bold underscore denotes "very likely match", and bold italic underscore denotes "certain match").

M1: MH3 O1+O3+O4 GW3, MH4 O3+O4 GW3 *O1* SS1, MH5 O3+O4 GW4 O1
M2: MH4 O1+O3+O4 GW3, MH5 O3+O4+O7 GW4
M3: MH3 O5+O6 GW2
M4: MH4 O3+O4+O7+O10GW4, MH5 O3+O4 GW3 O7
M5: MH3 Not identified
M6: MH2 Not identified O1 is here seen together with M1 where M1 is detected for the third time and O1 it thus a likely hit as an offspring to M1. A fourth hit is estimated by defining a relative distance separating O1 from O3+O4 by received signal strength determination by GW3. When O3+O4 is recognized for the fifth time by GW4, but not O1, then O1 is determined to be a certain match as an offspring to M1.

Looking at the other received identities by the gateways in this figure determines O3+O4 as certain hit as offspring to M2 by fourth and fifth hit on the third gateway GW3 respective the fourth gateway GW4. O7 is recognized first as a likely matched offspring to M4 to a very likely hit when O3+O4 changes status to certain matched offspring to M2, at the fourth gateway GW4.

Figure 10:
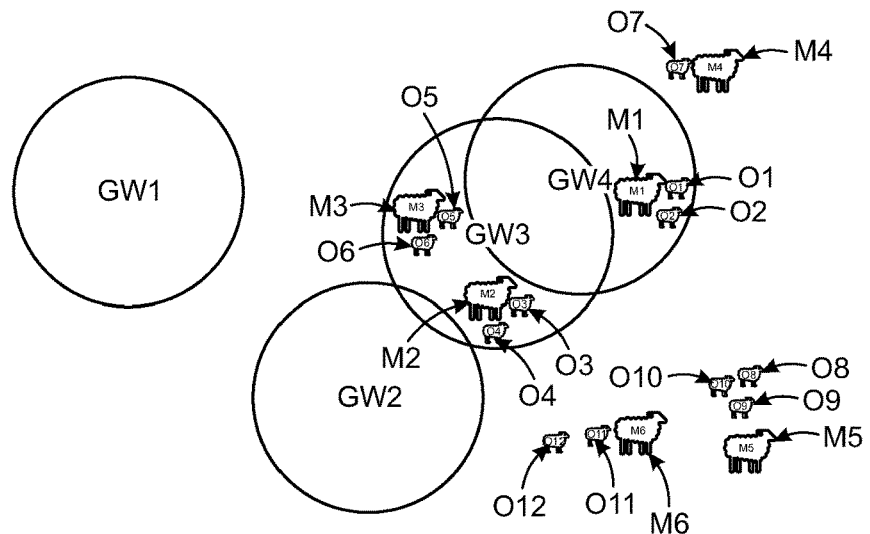

In FIG. 10, 10 seconds later than the scenario of FIG. 9, the scenario shows:

M1: MH6 O1+O2 GW4, MH7 O5+O6 GW3 O1+O2
M2: MH5 O3+O4+O5+O6 GW3
M3: MH4 O3+O4+O5+O6 GW3
M4: MH5 Not identified
M5: MH3 Not identified
M6: MH2 Not identified The changed scenario of the entities detected in FIG. 10 gives a further reading of O5+O6, thus changing their match status from likely to very likely match with M3.

Figure 11:
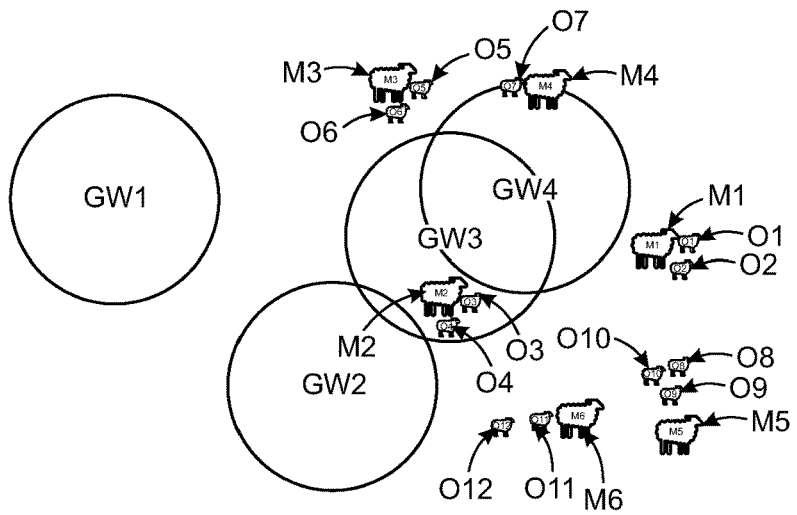
Figure 12:
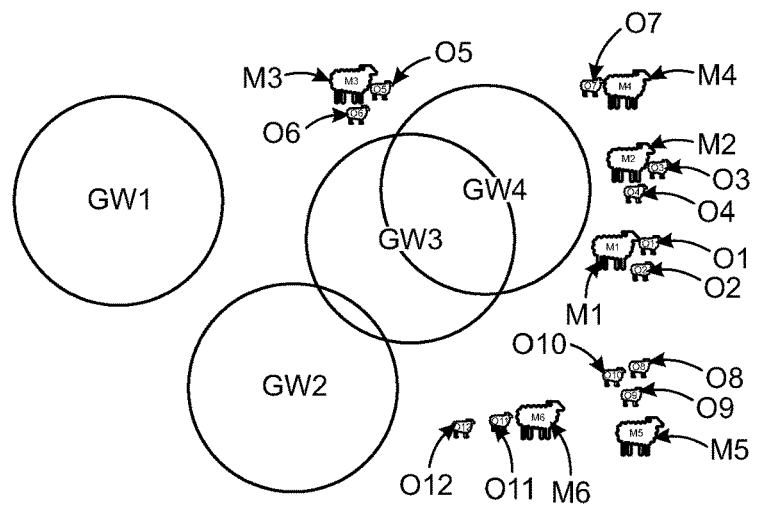
Figure 13:
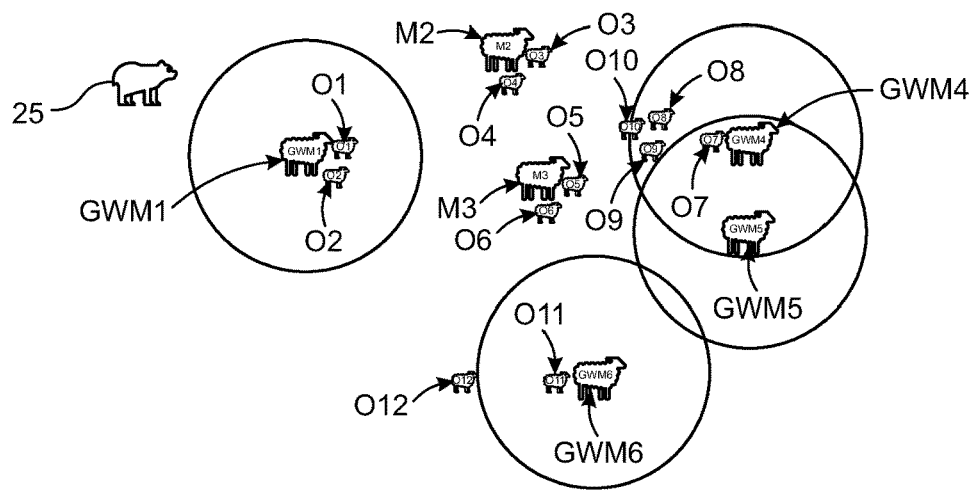
Figure 14:
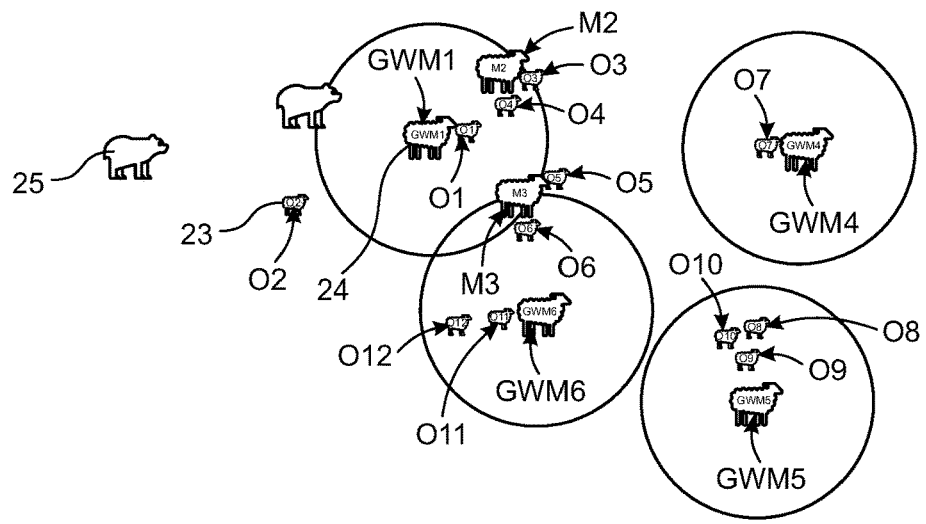
Figure 15:
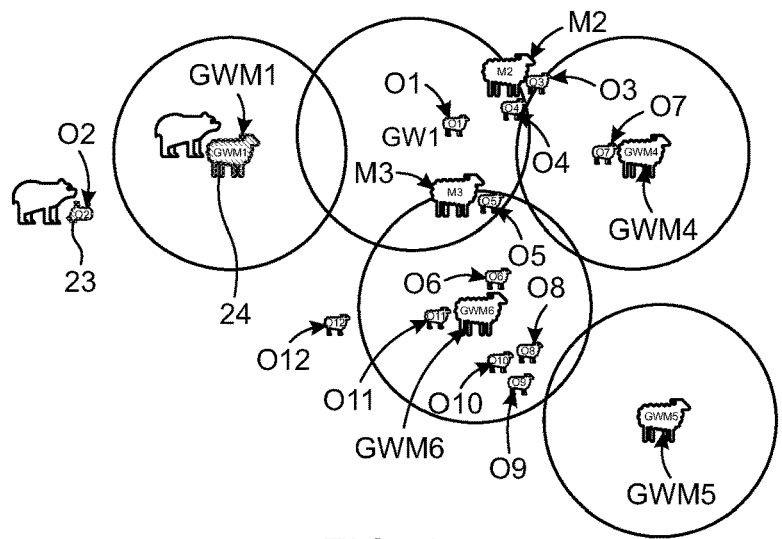
Figure 16:
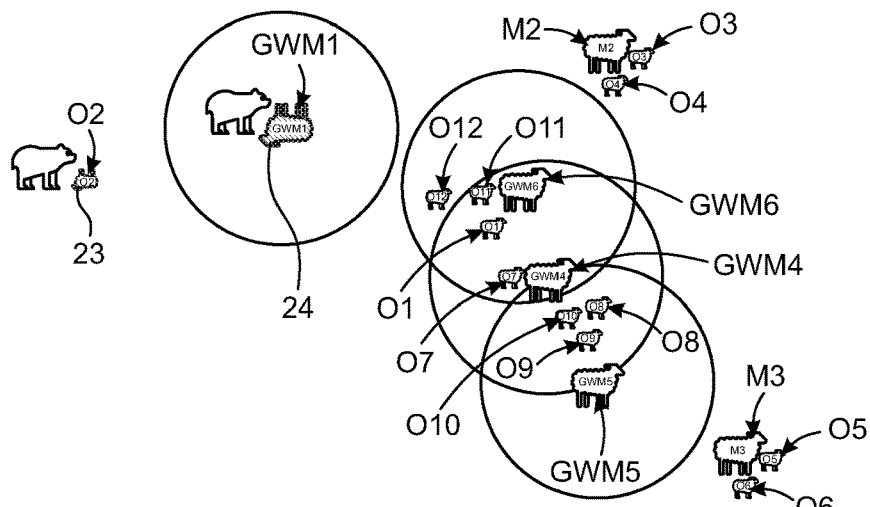

As the group of entities move a further 10 seconds in the next FIG. 11 it is detected:

M1: MH6 O1+O2 GW4, MH7 O5+O6 GW3 O1+O2
M2: MH6 O3+O4+O7 GW3, MH7 O7 SS1 GW4
M3: MH4 Not identified
M4: MH5 O3+O4+O7 GW4, MH6 O7SS1 GW4
M5: MH3 Not identified
M6: MH2 Not identified In this scenario it is determined that O7 changes status from maybe match to likely match and further to very likely and finally to a certain match as offspring to M4. The determination is aided by analyzing the distance determined for O7 from the GW4 at SS1, whilst the other O3+O4 would have a distance reading of 8 and 9 respectively (not identified in listing above).

In the scenario in FIG. 11 all entities have left the reach of any of the gateways, and the resulting determined relations after this passing of the group is:

M1: MH6 O1+O2
M2: MH6 O3+O4
M3: MH4O5+O6
M4: MH5 O7
M5: MH3 O8+O9+O10
M6: MH2 O9+O10+O11

In other words after the 60 seconds which was the duration of the group of entities passing the 4 gateways it is possible to determine that:

O1 is a certain match as offspring to M1, and O2 is a very likely match as offspring to M1. O3 and O4 is a certain match as offspring to M2. O5 and O6 is a very likely match as offspring to M3. O7 is a certain match as offspring to M4. O9 and O10 is a likely match as offspring to M5. Finally O9, O10 and O11 is a maybe match as offspring to M6. O8 is an undetermined status.

It can thus be determined that O1-O7 has pretty good match status, and O8-O12 has uncertain status and need more observations to be determined.

Figure 17:
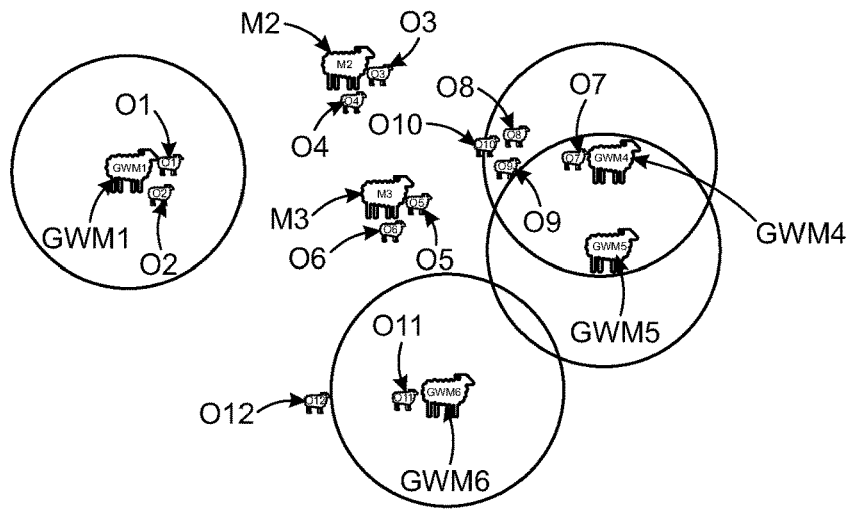
Figure 18:
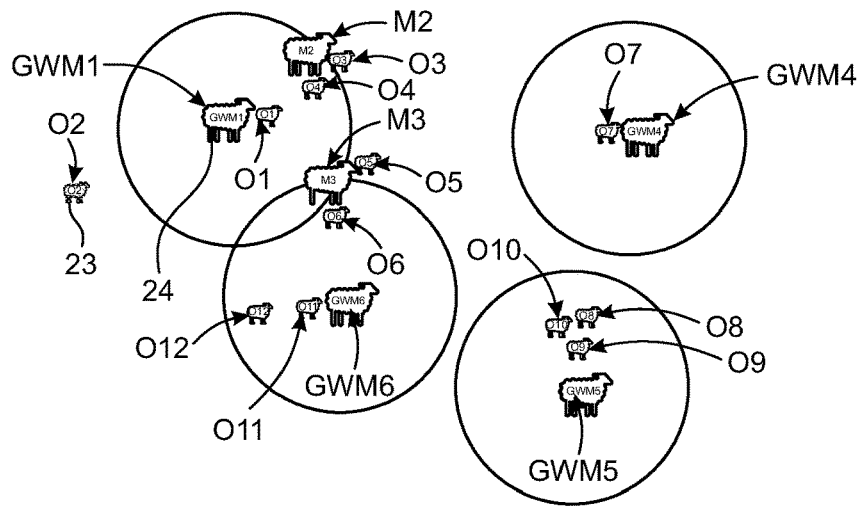
Figure 19:
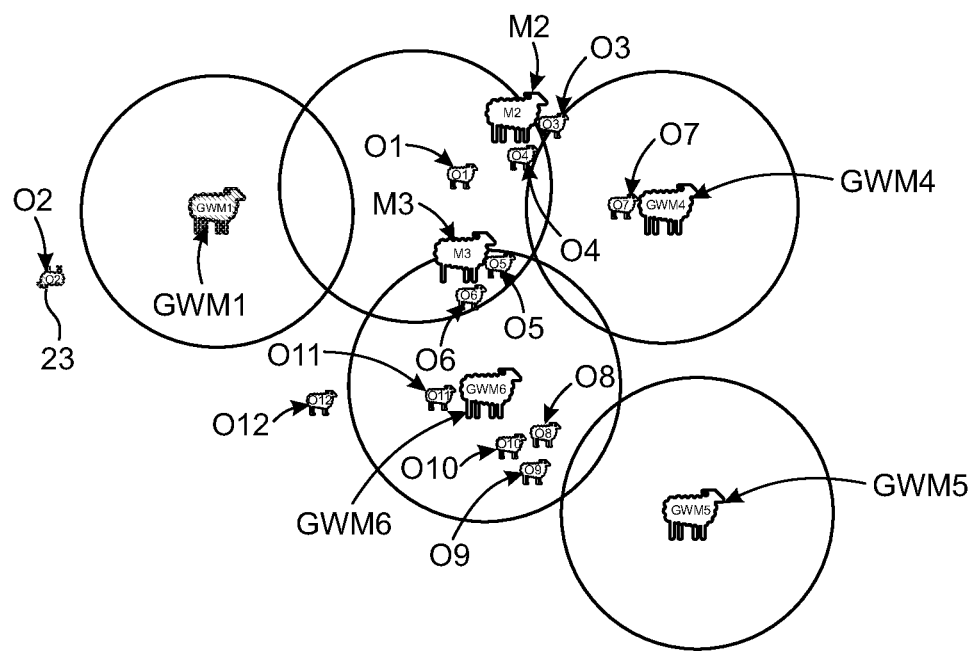
Figure 22:
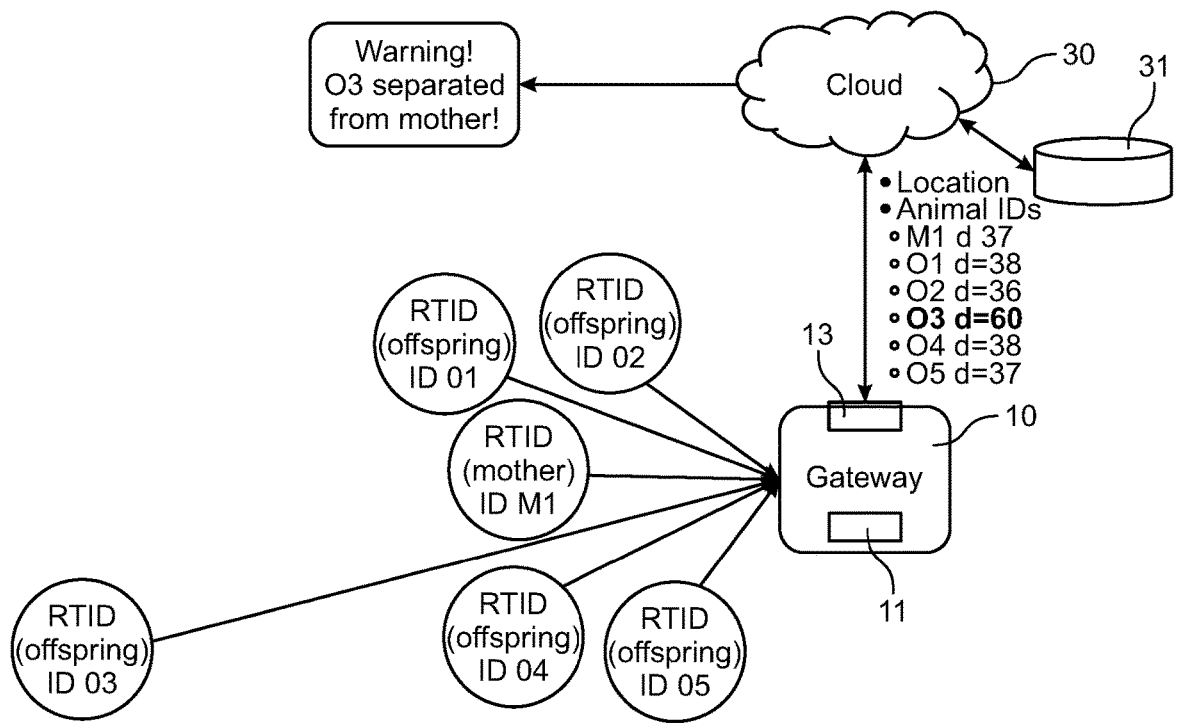

The scenarios above are describing how the inventions according to the present disclosure may be used to autonomously count and/or determine relations between entities in a group of entities. The determination of which entity is offspring and which is related to which parent is important information to use when surveilling a group of entities. In the examples given in the figures where a flock of sheep is surveilled. The relations information may be used to determine when an entity is separated from a related entity. When a relation is confirmed and stored in the system, the gateways may be used for detecting if related entities 23,24 are separated. FIG. 22 show this in a flow diagram, and the simulation in FIG. 17 and FIG. 18 show that when one or repeated timeframes do not reveal that entities, that are earlier defined as related, is detected, it may be raised an alarm that one or more relatives are missing.

Thus, mitigating actions may be facilitated to pair separated related entities 23,24.

FIG. 13 to 16 illustrates How the gateways may be used to determine if an unwanted predator is entering the environment of the group of entities. The example illustrates two bears 23 chasing the sheep, and where O2 and M1 has been separated from the other entities of the group and been attacked. It is possible to detect which entity is separated from the group, and which is pacified inside a gateway reach. In this specific scenario it is used mobile gateways arranged on M1, M6, M4 and M5. As the situation evolves it is possible to determine that M1 is separated from the flock, and that O1 is eventually following M6, and that M1 has stopped moving. O2 is nowhere to be found. Owner (farmer) may now assume that M1 is taken down and can react quickly and find the assumed dead animals. Quick identification of a predator attack is necessary both for activating mitigating efforts, but also for reporting to authorities and for claiming compensation.

The tag 1 may additionally comprise a passive or active RFID tag.

Thus, to function as depicted in the disclosure the tag may further comprise one or more of: a battery, a processing device, a wireless communication device, an accelerometer, a magnetometer, a GPS (Geo Position Sensor), satellite communication module, and one or more environment sensors.

The gateway 10 for receiving the identity of any entity 21,22 may comprises one or more of: power supply by grid or battery, a processing device, wireless communication device, an accelerometer, a magnetometer, a GPS (Geo Position Sensor), satellite communication module and one or more environment sensors, the gateway 10 being stationary or mobile.

The second aspect of this disclosure shows a system for matching related entities comprising a group of entities 20, wherein any of the entities 21,22 carries a tag 1 as discussed above, and two or more gateways 10, 10' as discussed above communicating with a back office system such as a cloud services 30.

The back office system, such as a cloud services 30, may comprise one or more of:
  a database for storing identities and relationships among the identities within the group of identities,
  processing means for providing further statistics for the group of identities, and
  a communication interface for communicating and/or exchanging data with third part service providers or authorities or other services.

The system may further comprise:
  one or more mobile communication devices 13 comprising at least a first communication module for communicating with the gateways 10 and/or the tags 1 carried by the entities, and optionally:
  the communication devices further comprising a second communication module for communicating with the cloud services 30 for sending/receiving data and analysis data to/from the cloud services 30.

The mobile communication device may be a smartphone. Several system scenarios are depicted in FIG. 20 to FIG. 23.

In FIG. 20 it is shown how one gateway may serve as a networked gateway 10' communicating with further gateways 10 and is used as a relay gateway to the back office services, cloud service. It is assumed that all the gateways 10, 10' are detecting the Real Time ID (RTID) from passing entities and transfer data collected to the back office services.

It is also emphasized that the cloud based services may be connected to/communicate with third party entities, such as government bodies/services, here represented by, but not limited to: EU TRACES.

Figure 21:
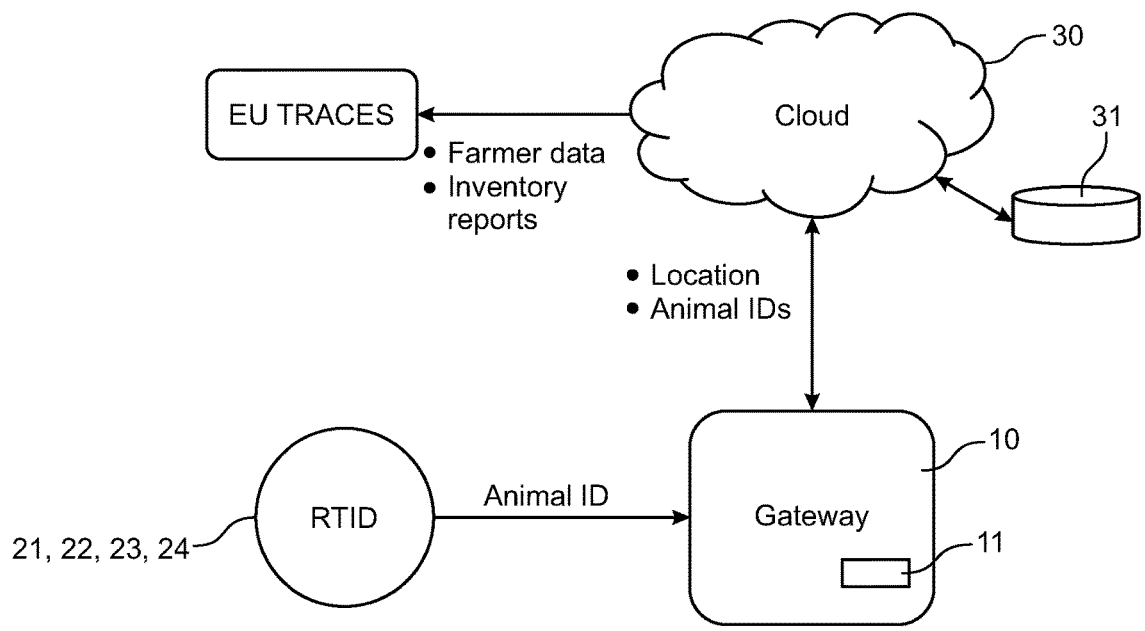

In FIG. 21 it is identified that for example an animal ID is communicated to the gateway, and the gateway pass on this RTID to the cloud service at intervals together with location data added by the gateway. When the gateway is non-mobile entity, the location data may be programmed into the gateway (stored in memory). When gateway is mobile, the gateway may comprise position date, for example from, but not limited to, a GPS (global positioning system) or other module comprised in the gateway 10, 10'. The cloud service may communicate with the gateway, and add associated data such as farmer Id, slaughter house history, loss reports and other when communicating data to third party services, such as EU TRACES.

In FIG. 22 it is exemplified further features comprised in the gateway and the cloud/back office services. The gateway may in this scenario report assumed distance of the RTIDs from the gateway. In this instance the distance (invers signal strength) has a range from 1-100. Any range may be defined. The range is used only as an indicative measure to determine assumed separation distance of objects. A seen in this example, O1-O5 distance from gateway range from 37 to 60, where O3 stands out as having a determined distance from gateway at 60, while all the other O1.O2, O4, and O5 has a relative distance of 38, 36, 38, 37 respectively and M1 has 37. There are two possible reasons for the anomaly reading of O3, either the signal is deteriorated by the signal from O3 is attenuated by some obstacle hindering the signal to reach the gateway, or O3 is far away from the others, that is separated from the others.

Either way, the system may be set up to issue a warning that O3 is separated from M1. Variations in warning schemes may apply, varying in accordance with type of entities normal behavior.

Figure 23:
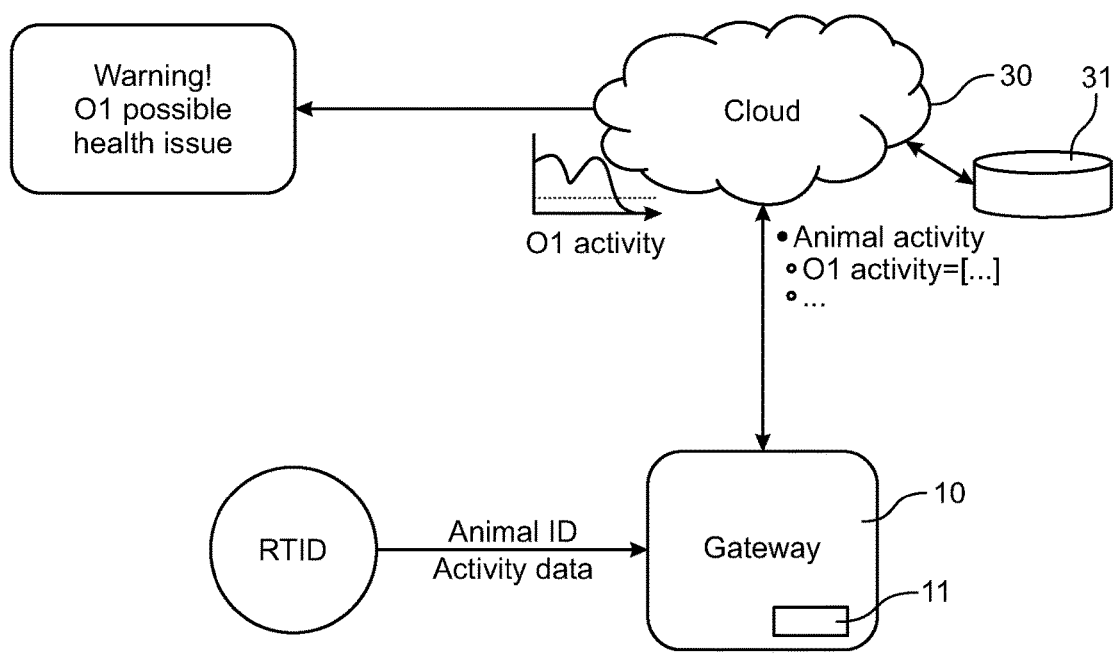

In FIG. 23 there is exemplified an even further scenario where the tag may comprise behavior data. Behavior data may be composed of sensor data from for example one or more of: gyro sensor, accelerometer, temperature sensor, inclinometer, GPS (Global Position System), or other, comprised in the tag that is carried by the entity, ie. ear tag carried by a sheep. The activity data may be communicated to the gateway at pre-determined transmissions only, for example every 10 minute, once every day, or in every data transmission, for example every 10 second. Cloud/back office services may then use this behavior data to determine if the entity has a normal or deviating behavior pattern, and in an advanced application even be able to detect specific illnesses. The behavior pattern may be used to train a neural network in an AI (Artificial Intelligence) setting, such that an AI module may be trained for example for early detection of specific health issues.

Figure 23A:
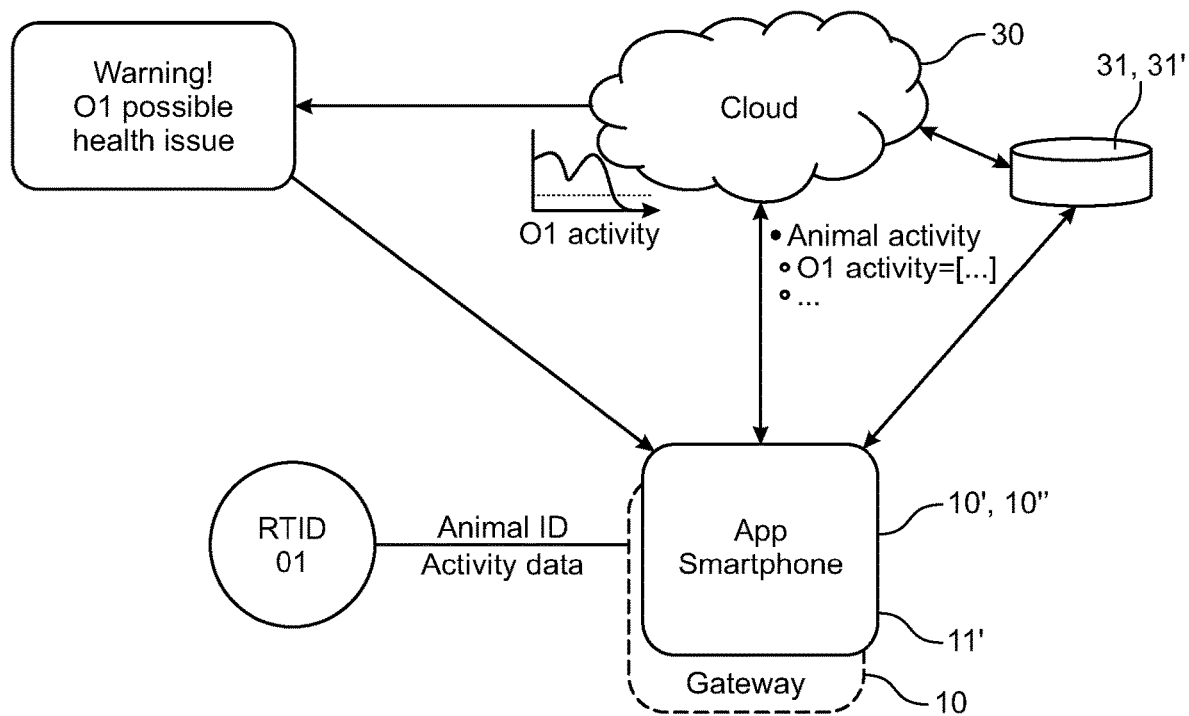

In a further embodiment of present disclosure a Bluetooth enabled tag communicates directly with a Smartphone 10" functioning as a standalone controlling device 10" or a network device 10' having an application (App) for presenting or forwarding any data from the Bluetooth enabled tag. The App being provided and installed and running on the smartphone may thus perform all or some of the tasks discussed for the gateway 10 in this disclosure, and a gateway 10 may be partly or completely be omitted without losing any features. This way the App running on the smartphone 10', 10" may present a user with real time status of the carrier of the Bluetooth enabled tags. All or parts of the back office services may additionally be provided in the App running on the smartphone. The smartphone 10', 10" may communicate with a cloud based back office service via the smartphones network. The communication protocols and the computer/communication devices used to facilitate the data transmissions between the ear tag/smartphone (App) and the back office services may be chosen from well-known techniques. The App may further comprise a graphical user interface for communicating data to and from a user, such that the Smartphone App 10" may operate and handle all or some of the data communicated from the tags 1. In FIG. 23A it is illustrated how a Smartphone App might execute parts of the gateways tasks, but also be prepared for executing back office tasks either partly or completely. Local storage 31' 31' may be partly or completely be provided with the memory available in the Smartphone. And also any activities and warning messages may be directly assessed and executed on the Smartphone running the App. Although only the one figure is illustrated with the app running on a Smartphone, it should be understood that for any of the embodiments in this disclosure an App may be provided in a Smartphone wherein the App replaces partly or completely both the gateway functions and/or the cloud based/network based back office services.

In one advantageous embodiment the Smartphone with the installed App acts as the sole contact point and data manager communicating with and receiving data form the Bluetooth enabled tags 1, which in one example use case is attached to individual animals in a livestock group. Thus, this way the livestock owner/herder may have continuous reports of the animal and its offspring. Real time overview of each individual animal may be of high importance in various environments, such as for example in situation wherein a group of animals are brought to a pen, or transported in livestock carriers to the slaughter house.

The person skilled in the art realizes that the present disclosure is not limited to the preferred embodiments described above. The person skilled in the art further realizes that modifications and variations are possible within the scope of the appended claims.

Additionally, variations to the disclosed embodiments can be understood and effected by the skilled person in practicing the claimed disclosure, from a study of the drawings, the disclosure, and the appended claims.

What is claimed is:

1. A method for determining a mother-offspring match between entities in a group of livestock entities, comprising:
    providing at least two or more gateways comprising identity detection capability;
    equipping each entity in a group of entities with a transmitting device and a tag, the tag broadcasting a signal comprising a unique tag id corresponding to a unique identity of said entity at predefined broadcasting intervals;
    detecting and determining, by at least two of the two or more gateways, the unique identity of any entity of the group of entities;
    receiving a first unique identity of any entity of the group of entities by a first of the two or more gateways;
    receiving a second unique identity of any other entity of the group of entities within a first predefined timeframe of the first unique identity by said first of the two or more gateways;
    comparing strength of the received signals of the first and second unique identities;
    determining relative closeness of the two compared entities;
    determining a probability of a relation between any two entities of the group of entities by the determined relative closeness of the two entities when read inside the first defined timeframe;
    receiving, by a further one of the two or more gateways, the first unique identity;
    comparing the first unique identity with the received second unique identity of any other entity of the group of entities received within a first defined timeframe of the received first unique identity by said further one of the two or more gateways;
    re-determine the probability of the relation between the two entities based on repeated determined relative closeness of the two entities relative each other identified by two or more gateways; and
    storing a confirmed relation between the identified entities when the probability of the relation is above a predefined probability threshold in an on-site and/or off-site data storage.

2. The method according to claim 1, wherein:
    a gateway comprises an omnidirectional or directional antenna for receiving said signals when the received signal strength is above a predefined threshold.

3. The method according to claim 2, wherein:
an antenna of the gateway determines the direction of the broadcasted unique identity of an entity.

4. The method according to claim 2, further comprising:
determining the distance between an entity broadcasting its identity, based on the received signal strength of the broadcasted identity, and the gateway.

5. The method according to claim 1, further comprising:
detecting if related entities are separated.

6. The method according to claim 1, further comprising:
activating mitigating actions to pair separated related entities.

7. The method according to claim 1, wherein the probability of a relation translates to being one of non-related, potential related, likely related, very likely related and certain related.

8. The method according to claim 1, wherein the related entities comprise a first entity being a mother and a second entity being an offspring of the mother.

9. The method according to claim 1, wherein the tag comprises one or more of: a battery, a processing device, a wireless communication device, an accelerometer, a magnetometer, or one or more environment sensors.

10. The method according to claim 1, wherein the gateway comprises identity detection capability for detecting the identity of any entity comprising one or more of: power supply by grid or battery, a processing device, wireless communication device, an accelerometer, a magnetometer, or one or more environment sensors, the gateway being stationary or mobile.

11. The method according to claim 1, wherein the gateway is configured to communicate data at least one of to or from a remote service provider, being one of a cloud base service or a network based service running a back office services, and wherein the method comprises:
communicating data from at least one of the tags or gateway controller to the back office services, and
providing the back office service with services for data escrow from the tags communicated from the gateways.

12. The method according to claim 1, wherein the gateway is a Smartphone hosting an App, wherein the method comprises:
providing the App with the features of the gateway.

13. The method according to claim 12, further comprising:
providing the App with the features of the back office service.

14. A system for determining a mother-offspring match between entities in a group of livestock entities, the system comprising:
one or more processors configured to:
detect and determine, by at least two of the two or more gateways, a unique identity of any entity of a group of entities, the at least two or more gateways comprising identity detection capability, and each entity in the group of entities being equipped with a transmitting device and a tag, the tag configured to broadcast a signal comprising a unique tag id corresponding to a unique identity of said entity at predefined broadcasting intervals;
receive a first unique identity of any entity of the group of entities by a first of the two or more gateways;
receive a second unique identity of any other entity of the group of entities within a first predefined timeframe of the first unique identity by said first of the two or more gateways;
compare strength of the received signals of the first and second unique identities;
determine relative closeness of the two compared entities;
determine a probability of a relation between any two entities of the group of entities by the determined relative closeness of the two entities when read inside the first defined timeframe;
receive, by a further one of the two or more gateways, the first unique identity;
compare the first unique identity with the received second unique identity of any other entity of the group of entities received within a first defined timeframe of the received first unique identity by said further one of the two or more gateways;
re-determine the probability of the relation between the two entities based on repeated determined relative closeness of the two entities relative each other identified by two or more gateways; and
store a confirmed relation between the identified entities when the probability of the relation is above a predefined probability threshold in an on-site and/or off-site data storage.

15. The system according to claim 14, wherein the system further comprises one or more of:
a database configured to store identities and relationships among the identities within the group of identities, and
a communication interface configured to at least one of communicate or exchange data with third part service providers or authorities or other services.

16. The system according to claim 14, further comprising:
one or more mobile communication devices comprising at least a first communication module for communicating with at least one of the gateways or the tags carried by the entities, and
the communication devices further comprising a second communication module for communicating with the one or more processors for sending/receiving data and analysis data to/from the one or more processors.

17. The system according to claim 16, wherein the one or more mobile communication devices is a Smartphone.

18. The system according to claim 14, wherein some of or all the features of at least one of the gateways or the one or more processors are hosted by an App installed on a Smartphone, and
the App comprises a graphical user interface to communicate data to and from a user, such that the Smartphone App operates and handles data communicated from the tags.

* * * * *